(12) United States Patent
Huang

(10) Patent No.: US 9,958,690 B2
(45) Date of Patent: May 1, 2018

(54) AUTOSTEREOSCOPIC DISPLAY SCREEN AND AUTOSTEREOSCOPIC DISPLAY DEVICE USING THE SAME

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 33 days.

(21) Appl. No.: 15/208,624

(22) Filed: Jul. 13, 2016

(65) Prior Publication Data

US 2017/0276952 A1    Sep. 28, 2017

(30) Foreign Application Priority Data

Mar. 22, 2016    (TW) .............................. 105108750 A

(51) Int. Cl.
*G02B 27/22*    (2018.01)
*H04N 13/04*    (2006.01)

(52) U.S. Cl.
CPC ..... *G02B 27/2214* (2013.01); *H04N 13/0404* (2013.01); *H04N 13/0409* (2013.01)

(58) Field of Classification Search
CPC ........... G02B 27/2214; H04N 13/0404; H04N 13/0409
USPC ................................ 359/463; 353/7; 349/15
See application file for complete search history.

(56) References Cited

U.S. PATENT DOCUMENTS

| | | | |
|---|---|---|---|
| 6,533,420 B1 | 3/2003 | Eichenlaub | |
| 6,710,920 B1 * | 3/2004 | Mashitani | G02B 27/2214 353/7 |
| 7,245,430 B2 | 7/2007 | Kobayashi et al. | |
| 7,688,509 B2 | 3/2010 | Vissenberg et al. | |
| 8,427,527 B2 | 4/2013 | Visser et al. | |
| 8,514,343 B2 * | 8/2013 | Shiau | G02B 3/005 349/15 |
| 2010/0027113 A1 * | 2/2010 | Shin | H04N 13/0404 359/463 |
| 2013/0057159 A1 | 3/2013 | Pijlman et al. | |

FOREIGN PATENT DOCUMENTS

| | | |
|---|---|---|
| CN | 101361375 B | 7/2011 |
| TW | I498665 B | 9/2015 |

* cited by examiner

*Primary Examiner* — Audrey Y Chang
(74) *Attorney, Agent, or Firm* — CKC & Partners Co., Ltd.

(57) ABSTRACT

An autostereoscopic display screen includes a light-deflecting component and a double-sided lenticular lens. The light-deflecting component is configured to deflect the light beam towards a plurality of directions. The double-sided lenticular includes a first cylindrical lens array, a second cylindrical lens array, and a central portion. The first cylindrical lens array faces towards light-deflecting component. The first cylindrical lens array includes first cylindrical lenses, and each of the first cylindrical lenses has a first length A in a first axial direction. The second cylindrical lens array faces away from the light-deflecting component. The second cylindrical lens array includes second cylindrical lenses, and each of the second cylindrical lenses has a second length B in the first axial direction. The first length A is greater than the second length B. The central portion is disposed between the first cylindrical lens array and the second cylindrical lens array.

13 Claims, 10 Drawing Sheets

112

AUTOSTEREOSCOPIC DISPLAY SCREEN AND AUTOSTEREOSCOPIC DISPLAY DEVICE USING THE SAME

RELATED APPLICATIONS

This application claims priority to Taiwanese Application Serial Number 105108750, filed Mar. 22, 2016, which is herein incorporated by reference.

BACKGROUND

Technical Field

The present disclosure relates to an autostereoscopic display screen and an autostereoscopic display device using the same.

Description of Related Art

With the development of technology, an optical product which can show a stereoscopic image has become a focal point in the consumer market. By exploiting the binocular parallax, a stereoscopic display device can provide different images to two eyes of an observer through optical elements, such that the observer can experience a stereoscopic image.

Unlike other types of stereoscopic display devices which require special glasses to distinguish left-eye and right-eye images, an autostereoscopic display device transmits light beams of different images to different spatial positions. Therefore, the eyes of an observer can receive different images from different angles so that the observer perceives a stereoscopic image without needing to wear the special glasses. Accordingly, autostereoscopic display technology can overcome problems and inconveniences associated with using the special glasses.

SUMMARY

An aspect of the present disclosure is to provide an autostereoscopic display screen which is applicable to an autostereoscopic display device, in which the autostereoscopic display device includes an image emitter and the autostereoscopic display screen includes a light-deflecting component and a double-sided lenticular lens. In the autostereoscopic display device, the number of observing zones can be increased through the autostereoscopic display screen, and the range of observable angle can be increased through the double-sided lenticular lens of the autostereoscopic display screen. Further, an image signal can be separated by the light-deflecting component and the same image can exist in the different observing zones, such that the observing zones can have repeatability. According to one or more desired parameter settings, the sizes of cylindrical lenses of the double-sided lenticular lens can be chosen or adjusted, thereby further adjusting the observing zones provided by the autostereoscopic display screen.

An aspect of the present disclosure is to provide an autostereoscopic display screen including a light-deflecting component and a double-sided lenticular lens. The light-deflecting component is configured to receive a light beam and deflect the light beam towards a plurality of directions. The double-sided lenticular lens is disposed at a side of the light-deflecting component and includes a first cylindrical lens array, a second cylindrical lens array, and a central portion. The first cylindrical lens array faces towards light-deflecting component. The first cylindrical lens array includes first cylindrical lenses, wherein each of the first cylindrical lenses has a first length (A) in a first axial direction. The second cylindrical lens array faces away from the light-deflecting component. The second cylindrical lens array includes second cylindrical lenses, wherein each of the second cylindrical lenses has a second length (B) in the first axial direction. The first length (A) is greater than the second length (B) (A>B). The central portion is disposed between the first cylindrical lens array and the second cylindrical lens array. The first cylindrical lens array, the central portion, and the second cylindrical lens array are arranged along an axis that is substantially perpendicular to the first axial direction.

In some embodiments, the autostereoscopic display screen is applied to an autostereoscopic display device. The autostereoscopic display device includes an image emitter disposed at a side of the autostereoscopic display screen, in which the light-deflecting component is optically coupled between the image emitter and the double-sided lenticular lens. The image emitter is configured to emit an image signal towards the autostereoscopic display screen, and the image signal has images provided in a time sequence.

In some embodiments, the light-deflecting component is configured to receive the image signal and deflect the image signal towards a number of traveling directions. The first cylindrical lens array is configured to receive a deflected image signal and effect a formation of an image in the central portion, in which the formed image in the central portion having a third length in the first axial direction. The first length is configured using a $[(2*M*N+1)*S]$ calculation and the second length is configured using a $(M*N*S)$ calculation, in which S is the third length, N is the number of traveling directions, and M is a positive integer greater than one.

In some embodiments, the light-deflecting component includes a plurality of alternately arranged refractive interfaces facing the double-sided lenticular lens, in which the light-deflecting component is configured to deflect the image signal and transmit the deflected image signal from the refractive interfaces toward a plurality of different deflected directions.

In some embodiments, the refractive interfaces are arranged along a third axial direction at an angle of 45 degrees relative to the first axial direction. The refractive interfaces extend along a fourth axial direction orthogonal to the third axial direction, and the light-deflecting component is configured to deflect the image signal a length corresponding to a distance between the refractive interfaces in the third axial direction.

In some embodiments, the light-deflecting component includes a light entry surface and a plurality of micro prisms located between the light entry surface and the double-sided lenticular lens.

In some embodiments, the micro prisms are arranged along a second axial direction provided at an angle of 30 degrees to 60 degrees relative to the first axial direction.

In some embodiments, optical axes of a portion of the first cylindrical lenses and optical axes of a portion of the second cylindrical lenses are parallel, and optical axes of another portion of the first cylindrical lenses and optical axes of another portion of the second cylindrical lenses coincide.

In some embodiments, the light-deflecting component is configured to receive the image signal and deflect the image signal towards a number of traveling directions, and the second length is configured using an equation wherein a ratio of the first length to the second length equals $[(2*M*N+1)/(M*N)]$, in which N is the number of the traveling directions and M is a positive integer greater than one.

An aspect of the present disclosure is to provide an autostereoscopic display device including an autostereoscopic display screen and an image emitter. The autostereoscopic display screen includes a light-deflecting component and a double-sided lenticular lens. The light-deflecting component is configured to allow a light beam to pass through it and deflect the light beam to travel towards multiple directions. The double-sided lenticular lens is disposed at a side of the light-deflecting component and includes a first cylindrical lens array, a second cylindrical lens array, and a central portion. The first cylindrical lens array is disposed on the central portion and is located between the light-deflecting component and the central portion. The first cylindrical lens array includes a plurality of first cylindrical lenses, wherein each of the first cylindrical lenses has a first length (A) in a first axial direction. The second cylindrical lens array is disposed on the central portion. The central portion is located between the first cylindrical lens array and the second cylindrical lens array. The second cylindrical lens array includes a plurality of second cylindrical lenses, wherein each of the second cylindrical lenses has a second length (B) in the first axial direction. The first length (A) is greater than the second length (B) (A>B). The first cylindrical lens array, the central portion, and the second cylindrical lens array are arranged along an axis that is substantially perpendicular to the first axial direction. The image emitter is disposed at a side of the autostereoscopic display screen, wherein the light-deflecting component is optically coupled between the image emitter and the double-sided lenticular lens. The image emitter is configured to emit towards the autostereoscopic display screen an image signal that has a plurality of images provided in a time sequence.

DETAILED DESCRIPTION

In the following detailed description, specific details are set forth in order to enable a thorough understanding of the disclosed embodiments. It will be apparent, however, that one or more embodiments may be practiced without these specific details. In some instances, well-known structures and devices are schematically shown in order to simplify the drawings.

It will be understood that, although the terms first, second, third etc. may be used herein to describe various elements, components, regions, layers and/or sections, these elements, components, regions, layers and/or sections should not be limited by these terms.

Herein described "image" may include a light-source-distribution-image, or other image comprising a light source or light beams, as would be understood by a person skilled in the art. To clarify, a light-source-distribution-image comprises images of, or viewed from, one or more perspectives of a target scope of view. The light-source-distribution-image may also include images of the light source or light beams viewed at different time periods or intervals.

An autostereoscopic display screen of the present disclosure includes a light-deflecting component and a double-sided lenticular lens. The autostereoscopic display screen is applicable in an autostereoscopic display device which includes an image emitter. In the autostereoscopic display device, the number of observing zones can be increased through the use of the autostereoscopic display screen, and the range of observable angle can be increased through the use of the double-sided lenticular lens of the autostereoscopic display screen. By utilizing different size and quantitative parameters of the cylindrical lenses of the double-sided lenticular lens, different observing zones may be provided by the autostereoscopic display screen. Further, the image signal is separated by the light-deflecting component to provide the same image at different observing zones, such that the observing zones can have repeatability.

Figure 1:
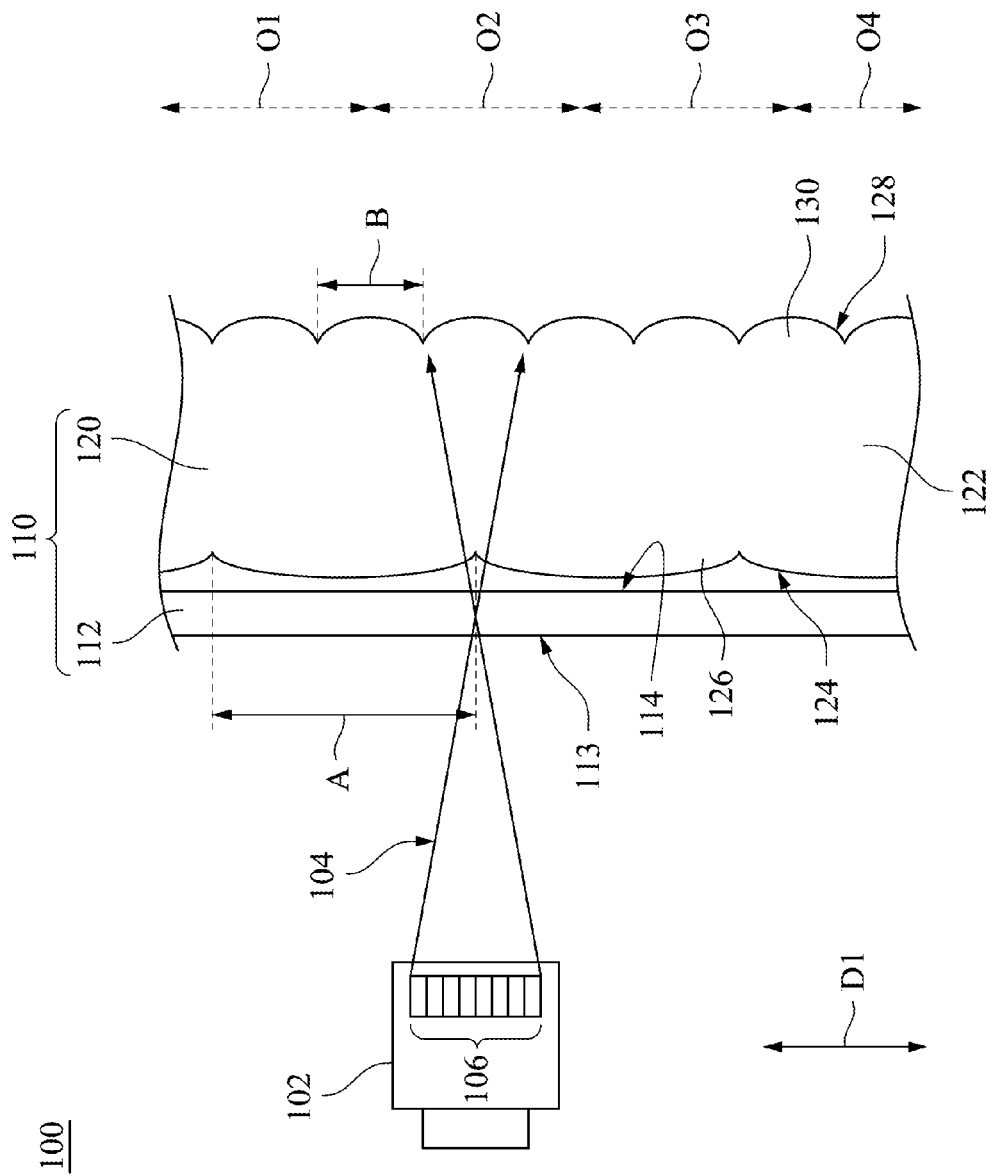
FIG. 1 is a schematic diagram showing a configuration of an autostereoscopic display device according to a first embodiment of the present disclosure.

Referring to FIG. 1, an autostereoscopic display device 100 is shown providing observing zones O1-O4 with stereoscopic images by time-multiplexing and spatial-multiplexing. Although four observing zones are illustrated in FIG. 1, the number of the observing zones may be more than four. The observing zones O1-O4 are arranged along a first directional axis D1, which may be intersected by a line of sight of an observer viewing the autostereoscopic display device 100. In other words, the first axial direction D1 may be parallel to the axial direction of a line connecting the eyes of the observer.

Shown in FIG. 1, the autostereoscopic display device 100 includes an image emitter 102 and an autostereoscopic display screen 110. The image emitter 102 is disposed at one side of the autostereoscopic display screen 110 (distal to the observing zone O1-O4) and configured to emit an image signal 104 toward the autostereoscopic display screen 110. The image signal 104 then travels to the observing zones O1-O4 through the guidance provided by the configuration of the autostereoscopic display screen 110. The autostereoscopic display screen 110 includes a light-deflecting component 112 (which may be a micro-deflector) and a double-sided lenticular lens 120. The double-sided lenticular lens 120 is disposed at one side of the light-deflecting component 112 proximal to the observing zones O1-O4. The light-deflecting component 112 is optically coupled between the image emitter 102 and the double-sided lenticular lens 120.

The double-sided lenticular lens 120 includes a central portion 122, a first cylindrical lens array 124, and a second cylindrical lens array 128, in which the central portion 122 is disposed between the first cylindrical lens array 124 and the second cylindrical lens array 128. The central portion 122, the first cylindrical lens array 124, and the second cylindrical lens array 128 may be integrally formed. The first cylindrical lens array 124 is disposed on the central portion 122 and located between the light-deflecting component 112 and the central portion 122. The second cylindrical lens array 128 is disposed on the central portion 122 on an opposite side to the first cylindrical lens array 124, such that the central portion 122 is located between the first cylindrical lens array 124 and the second cylindrical lens array 128. As shown, the first cylindrical lens array 124 faces towards the light-deflecting component 112, and the second cylindrical away 128 faces away from the light-deflecting component 112. Further, the first cylindrical lens array 124, the central portion 122, and the second cylindrical lens array 128 are arranged along an axial direction orthogonal to the first axial direction D1 is arranging direction.

The first cylindrical lens array 124 includes one or a plurality of first cylindrical lens 126 arranged along the first axial direction D1, and each of the first cylindrical lenses 126 has a first length A extending in the first axial direction D1. The second cylindrical lens array 128 includes one or a plurality of second cylindrical lenses 130, and each of the second cylindrical lenses 130 has a second length B extending in the first axial direction D1. As shown in the embodiment, the first length A is greater than the second length B (A>B). That is, each of the first cylindrical lenses 126 and each of the second cylindrical lens array 128 have the different sizes.

The configuration of the first cylindrical lenses 126 is not symmetrical to the configuration of the second cylindrical lens array 128, therefore light beams transmitting through the double-sided lenticular lens 120 can be distributed to desired locations such that the number of stereoscopic images zones can be increased. Further details of this are described later.

Referring to FIGS. 2A to 2D, the image emitter 102 comprises images 106 which may be provided in a time sequence. Accordingly, the autostereoscopic display device 100 can provide a time-multiplex effect through the image emitter 102.

For example, as shown, multiple images 106a-106c are emitted by the image emitter 102 in a time sequence. In one embodiment, the image emitter 102 can emit an image signal 104 with eight images 106 appearing in the time sequence (represented by the eight blocks of the images 106). The time sequence has eight time points, and the eight images 106 are emitted sequentially by the image emitter 102.

Figure 2B:
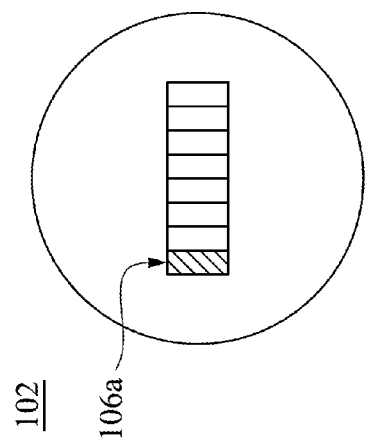
FIGS. 2B-2D are schematic front views of different images emitted in a time sequence by the image emitter shown in FIG. 2A.
Figure 2D:
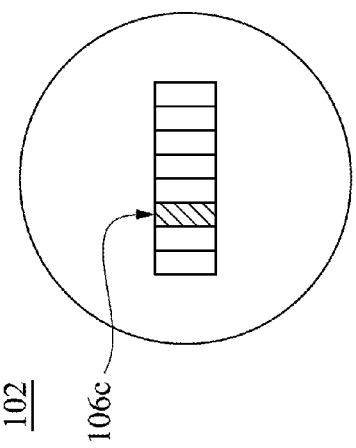
Figure 2A:
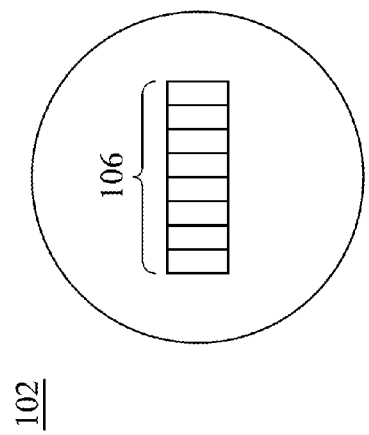
FIG. 2A is a schematic front view of an image emitter of the autostereoscopic display device illustrated in FIG. 1.
Figure 2C:
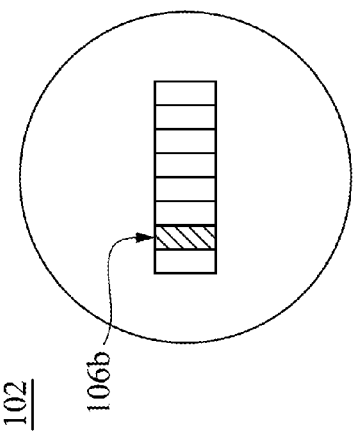

For example, in FIG. 2B, the image emitter 102 emits a first image 106a at a first time point of the time sequence. In FIG. 2C, the image emitter 102 emits a second image 106b at a second time point of the time sequence. In FIG. 2D, the image emitter 102 emits a third image 106c at a third time point of the time sequence. The rest of image are likewise emitted sequentially (not shown). After completing the entire time sequence (from the first time point to the eighth time point), a period for emitting the image signal 104 by the image emitter 102 is completed.

Figure 3A:
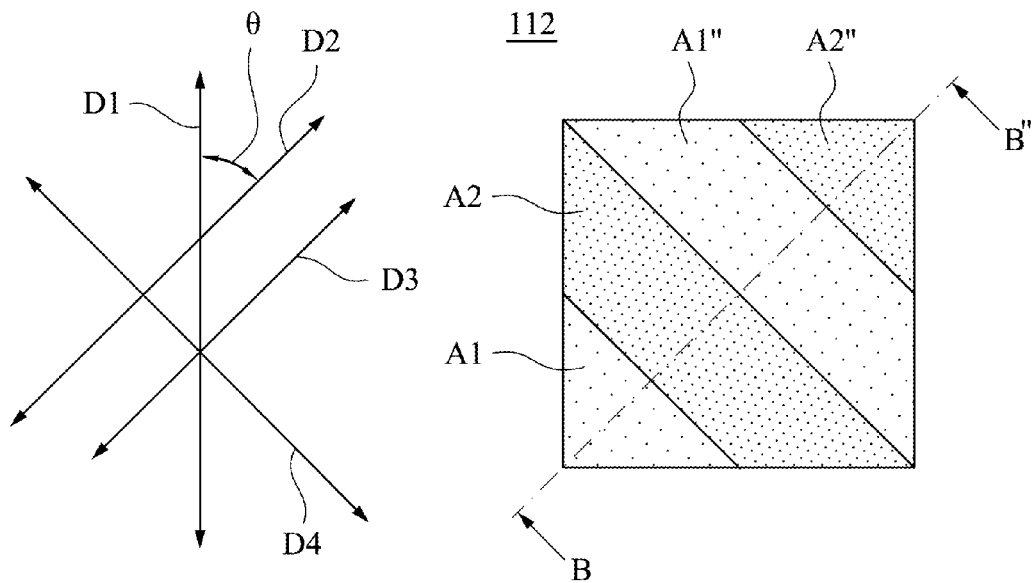
FIG. 3A is a schematic front view of a light-deflecting component of the autostereoscopic display screen illustrated in FIG. 1.

Referring to FIG. 1 and FIG. 3A, the light-deflecting component 112 includes a light entry surface 113 and a light exit surface 114 which are opposite to each other. The light entry surface 113 faces the image emitter 102 and the light exit surface 114 faces the double-sided lenticular lens 120. In FIG. 3A, a front view of the light deflecting component 112 is provided. Here, the "front view" is viewing the light-deflecting component 112 from the double-sided lenticular lens 120. In other words, the light-deflecting component 112 illustrated in FIG. 3A is viewed from the double-sided lenticular lens 120 toward the light exit surface 114 of the light-deflecting component 112. Further, to assist with describing the illustration, representations of the axial directions are also provided in FIG. 3A.

The light-deflecting component 112 is configured to allow a light beam to pass through it and be deflected, thereby enabling the light beam to travel toward more than one direction. For example, a light beam passing through the light-deflecting component 112 can travel toward N directions, in which N is a positive integer greater than one. In the present embodiment, the light-deflecting component 112 is a second-order light-deflecting component, such that a light beam passing through it is deflected and can travel towards two directions (the value of "N" is two). For example, an image signal 104 emitted from the image emitter 102 can travel along two directions after passing through the light-deflecting component 112. Since the light beam passing through the light-deflecting component 112 can travel towards more than one direction, the autostereoscopic display device 100 can thus provide a spatial-multiplex effect through the use of the light-deflecting component 112.

Shown in FIG. 3A, the light-deflecting component 112 has a first refractive interface A1 and a second refractive interface A2. The first refractive interfaces A1 and the second refractive interfaces A2 are respectively illustrated by different cross-sectional dotted lines. Two first refractive interfaces A1 and two second refractive interfaces A2 are shown, but their numbers can be different with respect to the dimension or size of the light-deflecting component 112. A person having ordinary skill in the art may choose different numbers of the first refractive interfaces A1 and the second refractive interfaces A2 according to desired requirements.

The first refractive interfaces A1 and the second refractive interfaces A2 can be arranged alternately. Light beams passing through the first refractive interfaces A1 can travel toward a first deflected direction and light beams passing through the second refractive interfaces A2 travel toward a second deflected direction, in which the first deflected direction is different from the second deflected direction. For example, as the image signal 104 traveling along a single direction passes through the light-deflecting component 112, the image signal 104 leaves the light-deflecting component 112 from the light exit surface 114 having been deflected, then travel along two different directions.

Figure 3B:
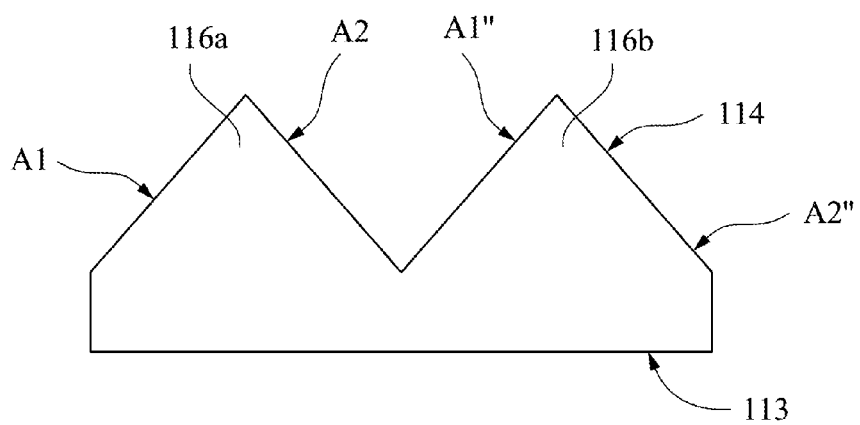
FIG. 3B is a schematic cross-sectional diagram viewed along dotted line B to B" illustrated in FIG. 3A.

Taking a cross-section view along line B to B" and referring to FIG. 3B, the light-deflecting component may include micro prisms 116a and 116b. As shown, the micro prisms 116a and 116b are provided on an opposite side to the light entry surface 113. In other words, the micro prisms 116a and 116b faces the double-sided lenticular lens 120. The light exit surface 114 of the light-deflecting component 112 can be formed by the micro prisms 116a and 116b. In the configuration shown, the first refractive interfaces A1 and the second refractive interfaces A2 may be two light exit surfaces of the micro prisms 116a and 116b respectively. That is, the micro prism 116a comprises two light exit surfaces of the first refractive interface A1 and the second refractive interface A2, and the micro prism 116b also comprises two light exit surfaces of the first refractive interface A1" and the second refractive interface A2".

Referring to both FIG. 3B and FIG. 3A, in the embodiment shown the first refractive interface A1, A1" is extends along a second axial direction D2 which is at an angle θ relative to the first axial direction D1. In other embodiments, the angle θ may range from 30 degrees to 60 degrees. For example, angle θ may be 45 degrees. As shown in the embodiment illustrated in FIGS. 3A and 3B, the second refractive interface A2 extends along a fourth axial direction D4 and a plurality of the second refractive interfaces A2 may be provided along a third axial direction D3. In the embodiment shown, the third and fourth axial directions D3, D4 are orthogonal, and so the third axial direction D3 is at an angle θ of 45 degrees relative to the first axial direction D1.

Figure 3C:
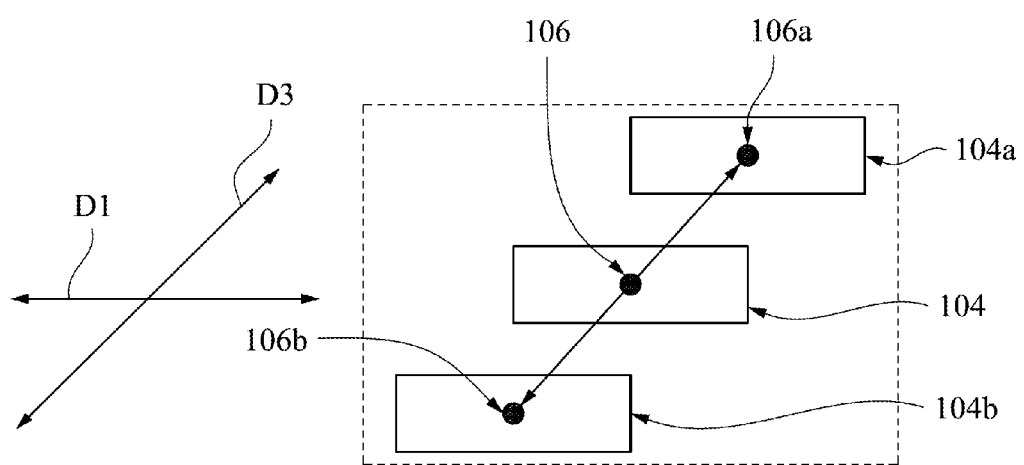
FIG. 3C is a schematic diagram showing a path of an image signal after passing through the light-deflecting component illustrated in FIG. 3A.

FIG. 3C shows a path of the image signal 104 after passing through the light-deflecting component 112. First axial directions D1 and third axial direction D3 are shown in FIG. 3C to provide reference for describing the path. Further, the image signal 104 illustrated in FIG. 3C travels from the light-deflecting component 112 toward the double-sided lenticular lens 120. That is, the image signal 104 illustrated in FIG. 3C corresponds to the image signal 104 illustrated FIG. 1 before entering the light-deflecting component 112. The other two deflected image signals 104a and 104b illustrated in FIG. 3C correspond to the image signal after passing through the light-deflecting component 112.

As previously described, the light-deflecting component 112 can deflect the image signal 104 from the image emitter 102 through the first refractive interfaces A1 and the second refractive interfaces A2. In the present embodiment, since the light-deflecting component 112 is a second-order light-deflecting component, the image signal 104 passing through the light-deflecting component 112 can travel towards two directions. In other words, after passing through the light-deflecting component 112, the image signal 104 becomes the deflected image signals 104a and 104b. Further, since the refractive interfaces of the light-deflecting component 112 are configured to deflect the image signal 104 a length corresponding to the distance between the refractive interfaces A1, A2 in the third axial direction D3, the configuration of the refractive interfaces can be used to achieve corresponding matching images 106, 106a, 106b locations.

With the above configuration, the refractive interfaces face a direction that is at the angle of 45 degrees relative to the first axial direction D1. Accordingly, after the image signal 104 passes through the light-deflecting component 112, the formed image signals 104a and 104b have displacements in the horizontal direction and the vertical direction from the image signal 104. With the arrangement of the angle of 45 degrees, the amount of displacement in the horizontal direction can be controlled to define the lengths of the observing zones O1-O4 in the first axial direction D1. Further, by arranging a plurality of the first refractive interfaces A1 and the second refractive interfaces A2 in alternating configurations, the image signals 104a and 104b formed by passing through the light-deflecting component 112 can have a more uniform brightness.

Figure 4:
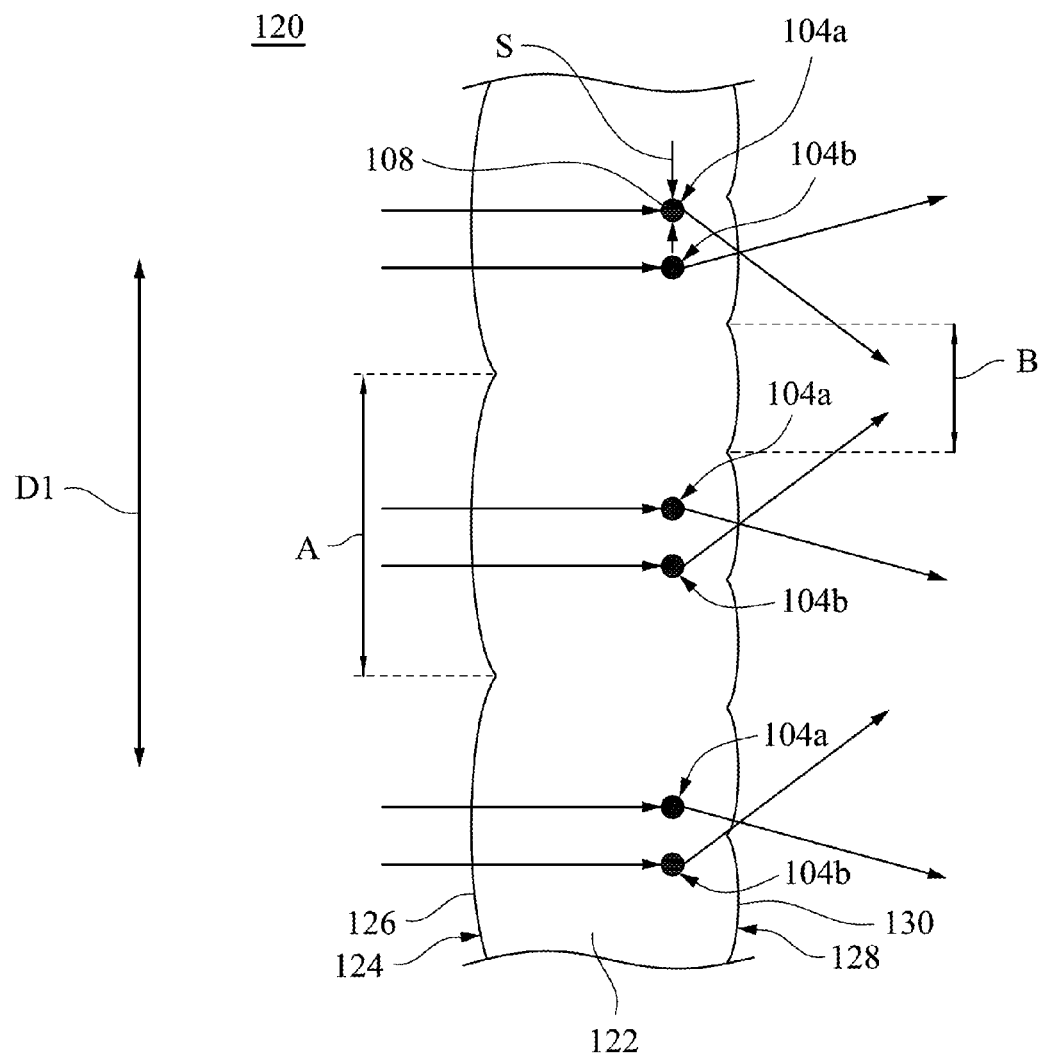
FIG. 4 is a schematic diagram showing a plurality of paths of image signals after passing through a double-sided lenticular lens of the autostereoscopic display screen illustrated FIG. 1.

FIG. 4 shows paths of the image signals 104a and 104b after passing through the double-sided lenticular lens 120 of the autostereoscopic display screen 110 illustrated FIG. 1. After the image signal 104 passes through the light-deflecting component 112, the formed image signals 104a and 104b then enter the double-sided lenticular lens 120. In some embodiments, the autostereoscopic display screen 110 can further include a Fresnel lens (not illustrated). The Fresnel lens can be disposed between the light-deflecting component 112 and the double-sided lenticular lens 120, and configured to enable the image signals 104a and 104b passing through the light-deflecting component 112 to be parallel and enter the double-sided lenticular lens 120. After the image signals 104a and 104b enter the double-sided lenticular lens 120, the image signals 104a and 104b, through the first cylindrical lens array 124, are imaged in the central portion 122 and become imaged signals 108. Each of the imaged signals 108 has a third length S in the first axial direction D1.

As previously described, after the image signal 104 passes through the light-deflecting component 112, the image signal 104 is separated into the image signals 104a and 104b, in which each pair of the adjacent imaged signals 108 are respectively formed from the image signals 104a and 104b through the first cylindrical lens array 124.

The lengths of the first cylindrical lenses 126 and the second cylindrical lens array 128 can be calculated according to parameters of the autostereoscopic display device 100. Shown in FIG. 4, a first length A of each of the first cylindrical lenses 126 in the first axial direction D1 is marked as A, and a second length B of each of the second cylindrical lenses 130 in the first axial direction D1 is marked as B. Each of the imaged signals 108 has a third length S in the first axial direction D1. The first length A may be calculated by [(2*M*N+1)*S], wherein M is a positive integer greater than one, and the magnitude of the second length B may be calculated by (M*N*S). In some embodiments, the positive integer M can be the number of whole stereoscopic images disposed in the observing zones O1-O4. For example, when the autostereoscopic display device 100 displays a stereoscopic vehicle image, in the observing range there are M number of whole stereoscopic vehicle images obtained and observed.

Under the condition in which two whole stereoscopic images are present in the observing range provided by the autostereoscopic display device 100, and the light-deflecting component 112 is the second-order light-deflecting component, the positive integer M is equal to 2 and the value N is equal to 2. Therefore, according to the calculations described above, the first length A is equal to 9 S, and the second length B is equal to 4 S. Further, a ratio of the first length A to the second length B can be substantially the same as the magnitude of [(2*M*N+1)/(M*N)] and can be expressed as (9/4).

As previously described, since the configuration of the first cylindrical lenses 126 and the second cylindrical lenses 130 are not symmetrical to each other, there is a shift relationship between the first cylindrical lenses 126 and the second cylindrical lenses 130. That is, the optical axes of a portion of the first cylindrical lenses 126 and the optical axes of a portion of the second cylindrical lenses 130 are parallel, and the optical axes of another portion of the first cylindrical lenses 126 and the optical axes of another portion of the second cylindrical lenses 130 coincide with each other. With the shift relationship between the first cylindrical lenses 126 and the second cylindrical lenses 130, the adjacent imaged signals 108 can be guided along different directions by the second cylindrical lenses 130, such that the adjacent imaged signals 108 having the same image can travel to the different observing zones O1-O4 respectively, thereby increasing the number of the zones which can provide the stereoscopic images.

In other words, the image signal 104 emitted from the image emitter 102 can be separated into the two image signal 104a and 104b through the light-deflecting component 112. Then, the two image signal 104a and 104b are imaged in the central portion 122 by the first cylindrical lens array 124 to become the adjacent imaged signals 108. The adjacent imaged signals 108 are respectively guided to the different observing zones O1-O4 by the second cylindrical lens array 128.

When passing through the double-sided lenticular lens 120, the light beam traveling toward the observing zones O1-O4 can have a wider angle of divergence than the light beam emitted from the image emitter 102. Therefore, the angle of divergence of the image signal 104 can be increased by the double-sided lenticular lens 120, thereby making the observing zones O1-O4 wider.

As described, in the autostereoscopic display device, the number of the observing zones can be increased by the autostereoscopic display screen, and the range of observable angle can be increased by the double-sided lenticular lens of the autostereoscopic display screen. By separating the image with the light-deflecting component, the same image can appear in different observing zones, such that the observing zones can have repeatability. Thus, different observing zones can provide the same image.

Further embodiments are herein described for light-deflecting component having orders higher than two, and with respect to the relationship between the magnitudes of the first length A and the second length B as.

Figure 5A:
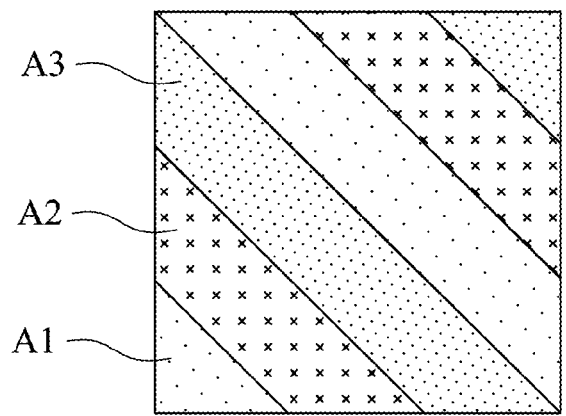
FIG. 5A is a schematic front view of a light-deflecting component according to a second embodiment of the present disclosure.
Figure 5B:
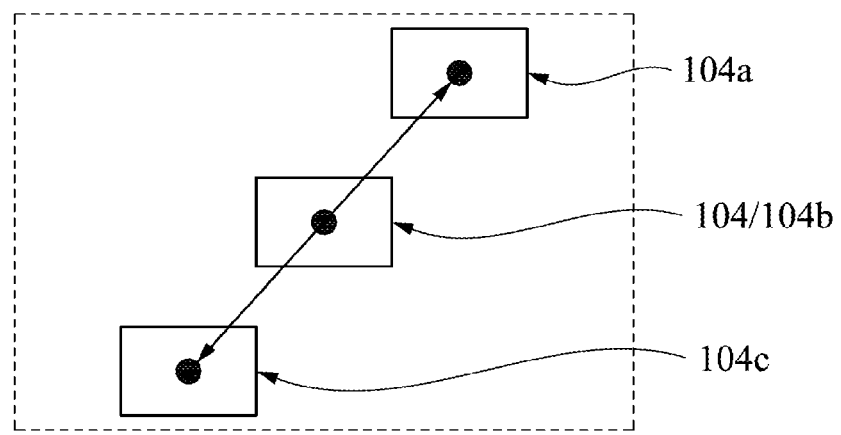
FIG. 5B is a schematic diagram showing a path of an image signal after passing through the light-deflecting component illustrated in FIG. 5A.

According to another embodiment, referring to FIG. 5A which shows the same as the view angle as FIG. 3A, a third-order light-deflecting component is provided. Shown in FIG. 5A, the light-deflecting component 112 has first refractive interfaces A1, second refractive interfaces A2 and a third refractive interfaces A3, each of which are respectively illustrated in different cross-sectional dotted lines. With the light-deflecting component 112 having three types of refractive interfaces, the image signal 104 can be separated into image signals 104a, 104b, and 104c traveling toward three directions after passing through the light-deflecting component 112. The traveling directions of the image signal 104 and the image signal 104b are parallel to each other and coincide with each other, and are illustrated at the same position in FIG. 5B.

Figure 6:
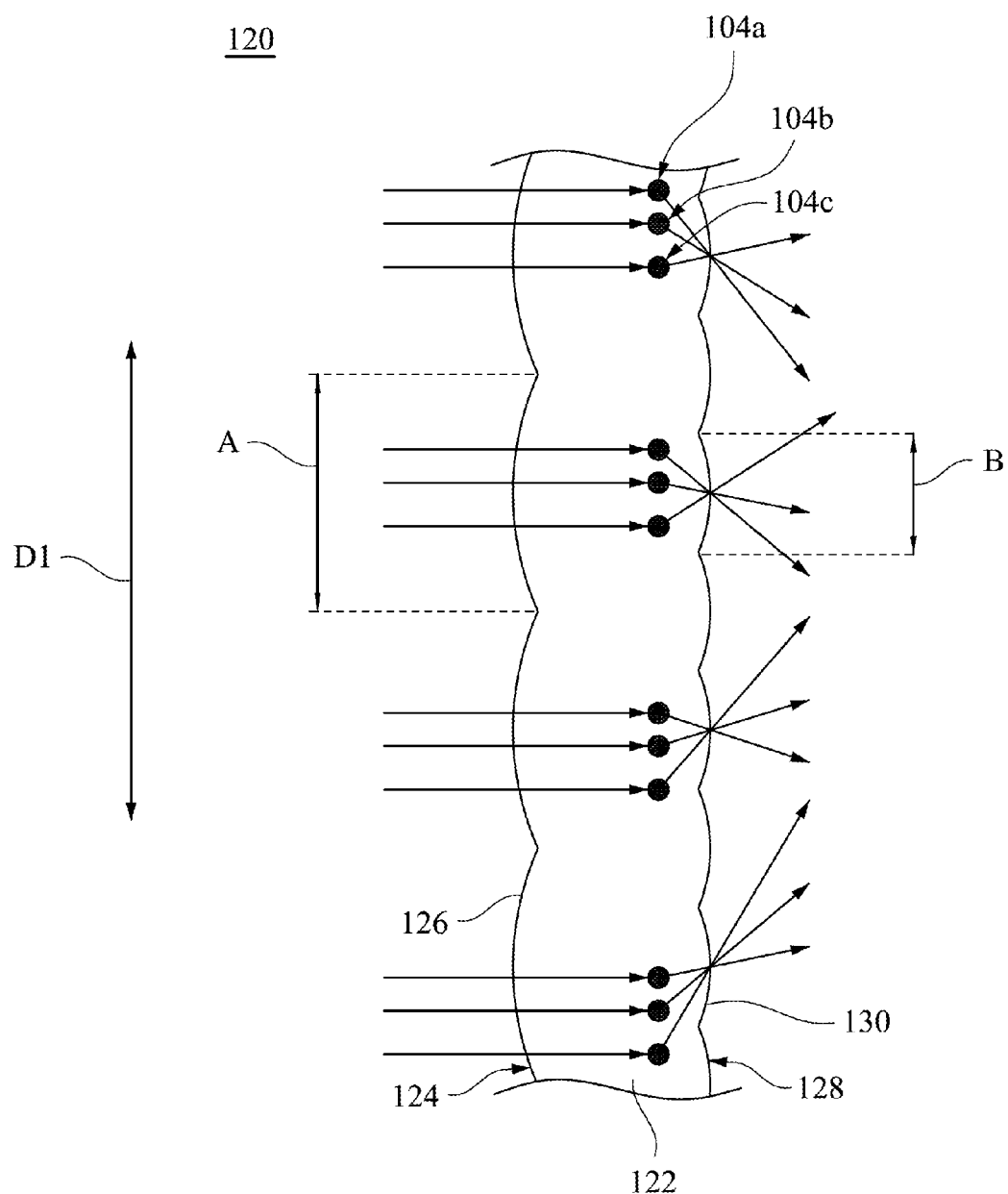
FIG. 6 is a schematic diagram showing a plurality of paths of image signals after passing through a double-sided lenticular lens of the second embodiment.

Referring to FIGS. 5A and 6, in the present embodiment, two whole stereoscopic images are disposed in the observing range, and the light-deflecting component 112 is a third-order light-deflecting component. Under this condition, the positive integer M is equal to 2 and the value N is equal to 3. According to the calculation of the first length A and the second length B described above, the first length A is equal to 13 S and the second length is equal to 6 S. The ratio of the magnitude of the first length A to the magnitude of the second length B can be expressed as (13/6).

Therefore, the first cylindrical lenses 126 of the first cylindrical lens array 124 and the second cylindrical lenses 130 of the second cylindrical lens array still have a shift relationship. With the shift relationship, the image signals 104a, 104b, and 104 separated by the light-deflecting component 112 can be guided to the different observing zones O1-O4 (see FIG. 1). Moreover, since the light-deflecting component 112 is the third-order light-deflecting component, the number of the same image in the observing zones O1-O4 can be increased as well, and the observing zones O1-O4 have the repeatability.

Figure 7A:
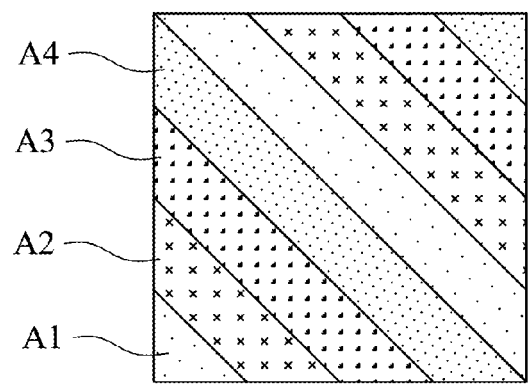
FIG. 7A is a schematic front view of a light-deflecting component according to a third embodiment of the present disclosure.
Figure 7B:
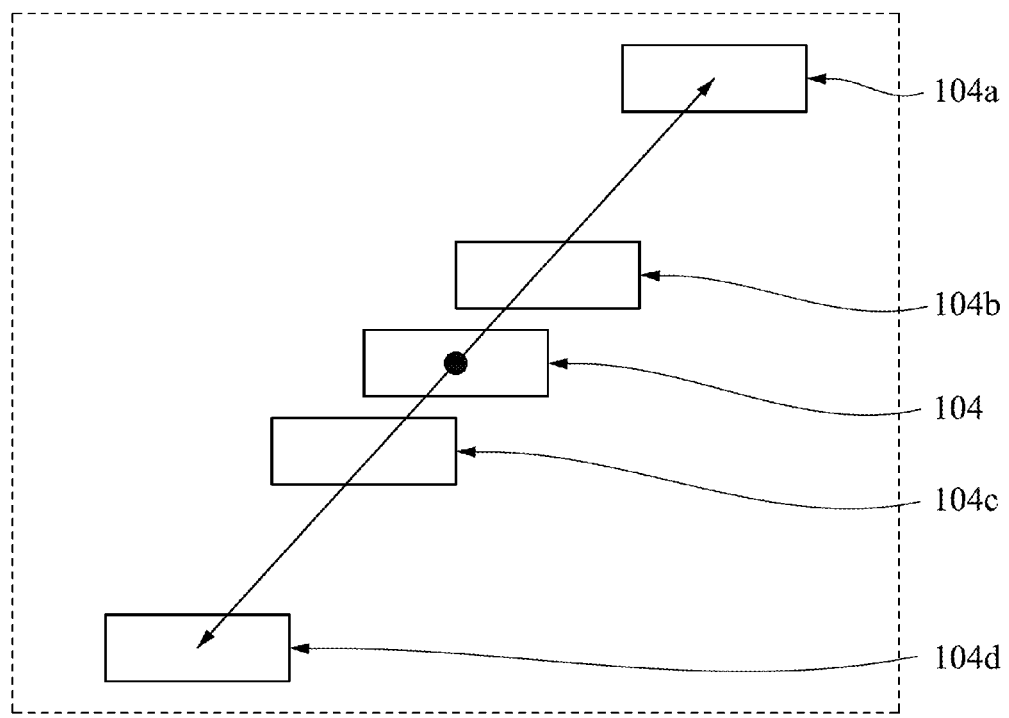
FIG. 7B is a schematic diagram showing a path of an image signal after passing through the light-deflecting component illustrated in FIG. 7A.

According to another embodiment, FIG. 7A shows a same viewing angle as FIG. 3A, wherein the light-deflecting component 112 is a fourth-order light-deflecting component having first refractive interfaces A1, second refractive interfaces A2, third refractive interfaces A3, and fourth refractive interfaces A4 (illustrated in different cross-sectional dotted lines). In this embodiment, the light-deflecting component 112 has four types of the refractive interfaces and the image signal 104 can be separated into image signals 104a, 104b, 104c and 104d, traveling toward four directions after passing through the light-deflecting component 112.

Figure 8:
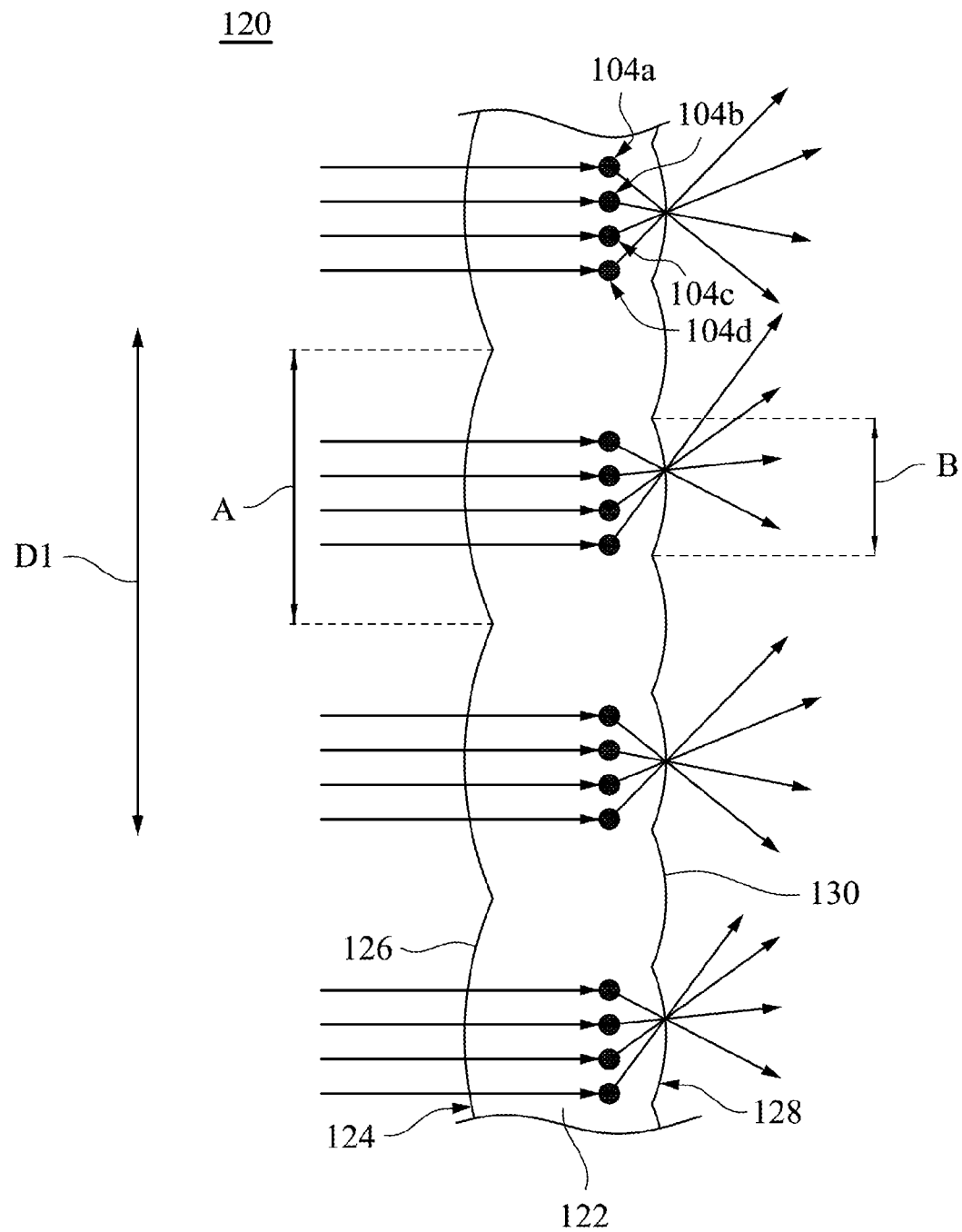
FIG. 8 is a schematic diagram showing a plurality of paths of image signals after passing through a double-sided lenticular lens of the third embodiment.

Referring to FIGS. 7A and 8, in the present embodiment, two whole stereoscopic images are disposed in the observing range, and the light-deflecting component 112 is the fourth-order light-deflecting component. Under this condition, the positive integer M is equal to 2 and the value N is equal to 4. According to the calculation of the first length A and the second length B described above, the first length A is equal to 17 S, the second length is equal to 8 S. The ratio of the magnitude of the first length A to the magnitude of the second length B can be expressed as (17/8) and under this configuration, the first cylindrical lenses 126 of the first cylindrical lens array 124 and the second cylindrical lenses 130 of the second cylindrical lens array still have a shift relationship therebetween.

Figure 9:
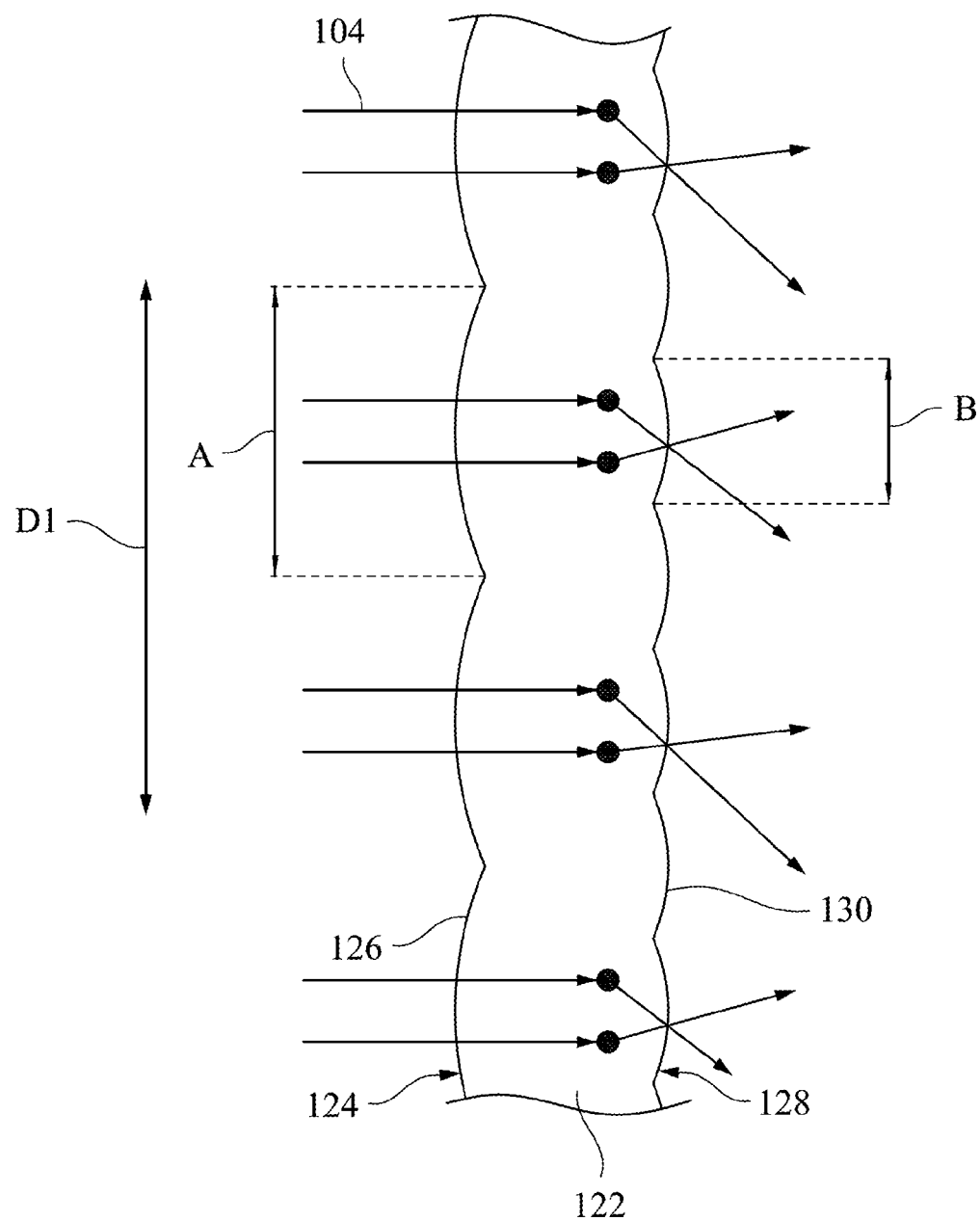
FIG. 9 is a schematic diagram showing a path of an image signal after passing through a double-sided lenticular lens of a fourth embodiment of the present disclosure.

FIG. 9 shows an image signal 104 after passing through the double-sided lenticular lens 120, according to a fourth embodiment. In this embodiment, three whole stereoscopic images are disposed in the observing range and the light-deflecting component 112 is a second-order light-deflecting component, as shown in FIG. 3A. With this configuration, the positive integer M is equal to 3 and the value N is equal to 2, and according to the previously described calculation, the first length A is equal to 13 S and the second length is equal to 6 S. The ratio of the magnitude of the first length A to the magnitude of the second length B can be expressed as (13/6) and the first cylindrical lenses 126 of the first cylindrical lens array 124 and the second cylindrical lenses 130 of the second cylindrical lens array have a shift relationship therebetween.

The autostereoscopic display screen of the present disclosure is applicable to a autostereoscopic display device, in which the autostereoscopic display device includes an image emitter and the autostereoscopic display screen includes a light-deflecting component and a double-sided lenticular lens. In the autostereoscopic display device, the number of observing zones can be increased through the autostereoscopic display screen, and the range of observable angle can be increased through the double-sided lenticular lens of the autostereoscopic display screen. Further, by separating the image signal with the light-deflecting component, the same image can exist in different observing zones, such that the observing zones can have repeatability. Furthermore, according to different parameter settings and configurations, the sizes of the cylindrical lenses of the double-sided lenticular lens can be varied, thereby further adjusting the observing zones provided by the autostereoscopic display screen.

Although the present disclosure has been described with reference to certain embodiments thereof, other embodiments are possible and the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of the present disclosure provided they fall within the scope of the following claims.

What is claimed is:

1. An autostereoscopic display screen, comprising:
a light-deflecting component configured to receive a light beam and deflect the light beam towards a plurality of directions; and
a double-sided lenticular lens disposed at a side of the light-deflecting component, the double-sided lenticular lens comprising:
a first cylindrical lens array facing towards the light-deflecting component and comprising a plurality of first cylindrical lenses, each having a first length in a first axial direction;
a second cylindrical lens array facing away from the light-deflecting component and comprising a plurality of second cylindrical lenses, each having a second length in the first axial direction, wherein the first length is greater than the second length; and
a central portion disposed between the first cylindrical lens array and the second cylindrical lens array, wherein the first cylindrical lens array, the central portion, and the second cylindrical lens array are arranged along an axis that is substantially perpendicular to the first axial direction, wherein the light-deflecting component comprises a light entry surface and a plurality of micro prisms located between the light entry surface and the double-sided lenticular lens, and the micro prisms are arranged along a second axial direction provided at an angle of 30 degrees to 60 degrees relative to the first axial direction.

2. The autostereoscopic display screen of claim 1 applied to an autostereoscopic display device comprising an image emitter disposed at a side of the autostereoscopic display screen, wherein the light-deflecting component is optically coupled between the image emitter and the double-sided lenticular lens, and wherein the image emitter is configured to emit an image signal towards the autostereoscopic display screen, the image signal comprising a plurality of images provided in a time sequence.

3. The autostereoscopic display screen of claim 2, wherein the light-deflecting component is configured to receive the image signal and deflect the image signal towards a number of traveling directions, and the first cylindrical lens array is configured to receive a deflected image signal and effect a formation of an image in the central portion, the formed image in the central portion having a third length in the first axial direction, wherein
the first length is configured using a $[(2*M*N+1)*S]$ calculation and the second length is configured using a $(M*N*S)$ calculation, and wherein
S is the third length, N is the number of traveling directions, and M is a positive integer greater than one.

4. The autostereoscopic display screen of claim 3, wherein the light-deflecting component comprises a plurality of alternately arranged refractive interfaces facing the double-sided lenticular lens, wherein the light-deflecting component is configured to deflect the image signal and transmit the deflected image signal from the refractive interfaces toward a plurality of different deflected directions.

5. The autostereoscopic display screen of claim 4, wherein the refractive interfaces are arranged along a third axial direction at an angle of 45 degrees relative to the first axial direction, and wherein the refractive interfaces extend along a fourth axial direction orthogonal to the third axial direction, and wherein the light-deflecting component is configured to deflect the image signal a length corresponding to a distance between the refractive interfaces in the third axial direction.

6. The autostereoscopic display screen of claim 1, wherein at least one optical axis of the first cylindrical lenses is parallel to at least one optical axis of the second cylindrical lenses.

7. The autostereoscopic display screen of claim 1, wherein the light-deflecting component is configured to receive the image signal and deflect the image signal towards a number of traveling directions, and the second length is configured using an equation:
a ratio of the first length to the second length equals $[(2*M*N+1)/(M*N)]$,
wherein N is the number of the traveling directions and M is a positive integer greater than one.

8. An autostereoscopic display device, comprising:
an autostereoscopic display screen comprising:
a light-deflecting component configured to allow a light beam to pass through it, thereby deflecting the light beam to travel towards multiple directions; and
a double-sided lenticular lens disposed at a side of the micro-light-deflecting component, the double-sided lenticular lens comprising:
a central portion;
a first cylindrical lens array disposed on the central portion and located between the light-deflecting component and the central portion, wherein the first cylindrical lens array comprises a plurality of first cylindrical lenses, and each of the first cylindrical lenses has a first length in a first direction; and
a second cylindrical lens array disposed on the central portion such that the central portion is located between the first cylindrical lens array and the second cylindrical lens array, the second cylindrical lens array comprising a plurality of second cylindrical lenses and each of the second cylindrical lenses having a second length in the first direction, wherein the first length of the first cylindrical lenses is greater than the second length of the second cylindrical lenses, and wherein the first cylindrical lens array, the central portion, and the second cylindrical lens array are arranged along an axis that is substantially perpendicular to the first axial direction, wherein the light-deflecting component comprises a light entry surface and a plurality of micro prisms, the micro prisms are located between the light entry surface and the double-sided lenticular lens and arranged along a second direction, the first direction is slanted at an angle relative to the second direction, and the angle is in a range from 30 degrees to 60 degrees;
and the autostereoscopic display device further comprising an image emitter disposed at a side of the autostereoscopic display screen, wherein the light-deflecting component is optically coupled between the image emitter and the double-sided lenticular lens, and the image emitter is configured to emit towards the autostereoscopic display screen an image signal comprising a plurality of images provided in a time sequence.

9. The autostereoscopic display device of claim 8, wherein the image signal is imaged in the central portion through the first cylindrical lens array, and the imaged image signal has a third length represented by S in the first direction, wherein the image signal passing through the light-deflecting component travels toward a plurality of traveling directions, and a magnitude of the first length and a magnitude of [(2*M*N+1)*S] are substantially the same, and a magnitude of the second length and a magnitude of (M*N*S) are substantially the same, wherein N represents the number of the traveling directions and M is a positive integer greater than one.

10. The autostereoscopic display device of claim 9, wherein the light-deflecting component has a plurality of refractive interfaces that face the double-sided lenticular lens and are arranged alternately, wherein the light-deflecting component allows the light beam to pass through it, thereby enabling the light beam to travel toward a plurality of deflected directions through the refractive interfaces, wherein any two of the deflected directions are different from each other.

11. The autostereoscopic display device of claim 10, wherein the refractive interfaces are arranged along a third direction and extended along a fourth direction, and the first direction is slanted at an angle of 45 degrees relative to the third direction, the third direction and the fourth direction are orthogonal, and the light-deflecting component deflects the image signal through the refractive interfaces, wherein a measure of the length of the diagonal line of one of the images and a length of each of the refractive interfaces in the third direction are substantially the same.

12. The autostereoscopic display device of claim 8, wherein at least one optical axis of the first cylindrical lenses is parallel to at least one optical axis of the second cylindrical lenses.

13. The autostereoscopic display device of claim 8, wherein the image signal passing through the light-deflecting component travels toward a plurality of traveling directions, and a ratio of a magnitude of the first length to a magnitude of the second length and a magnitude of [(2*M*N+1)/(M*N)] are substantially the same, wherein N represents the number of the traveling directions and M is a positive integer greater than one.

* * * * *